United States Patent [19]

Wortmann et al.

[11] 4,265,854

[45] May 5, 1981

[54] PROCESS INHIBITING THE COALESCENCE OF FLOWABLE PHOSPHORUS PENTACHLORIDE IN CLOSED CONTAINERS

[75] Inventors: Joachim Wortmann, Flörsheim-Wicker; Gerhard Rieb, Frankfurt am Main; Franz-Josef Dany; Joachim Kandler, both of Erftstadt, all of Fed. Rep. of Germany

[73] Assignee: Hoechst Aktiengesellschaft, Fed. Rep. of Germany

[21] Appl. No.: 86,815

[22] Filed: Oct. 22, 1979

[30] Foreign Application Priority Data

Oct. 25, 1978 [DE] Fed. Rep. of Germany ....... 2846364

[51] Int. Cl.$^3$ .................... B01J 19/00; C01B 25/10
[52] U.S. Cl. ...................................... 422/40; 423/268; 423/300
[58] Field of Search .................. 422/40; 423/268, 300

[56] References Cited

U.S. PATENT DOCUMENTS

| | | | |
|---|---|---|---|
| 1,926,395 | 9/1933 | Midgley | 422/40 X |
| 2,399,120 | 4/1946 | Hurd | 423/268 X |
| 2,689,166 | 9/1954 | Rust et al. | 423/268 |
| 3,661,530 | 5/1972 | Block | 423/268 |
| 3,919,405 | 11/1975 | Lenz et al. | 423/268 X |

*Primary Examiner*—Barry Richman
*Attorney, Agent, or Firm*—Connolly and Hutz

[57] ABSTRACT

A process inhibiting the coalescence of flowable phosphorus pentachloride in a closed container. To this end, the invention provides for a readily volatizable organic liquid boiling within the range about 20° to 200° C. and being inert with respect to phosphorus pentachloride to be admitted to the container prior to, during or after the introduction of phosphorus pentachloride thereinto, and for the container to be then hermetically sealed, the liquid being used in a proportion of about 1 to 15 weight %, based on the quantity of phosphorus pentachloride.

6 Claims, No Drawings

PROCESS INHIBITING THE COALESCENCE OF FLOWABLE PHOSPHORUS PENTACHLORIDE IN CLOSED CONTAINERS

This invention relates to a process permitting the coalescence of flowable phosphorus pentachloride in a closed container to be inhibited.

Freshly produced phosphorus pentachloride, which is briefly termed $PCl_5$ hereinafter, is a flowable, crystalline and white powder. On being stored in a closed container at room temperature, the powder particles are however liable to undergo coalescence to an increasing extent, and, in the end, encrustation after a few weeks. Needless to say, coalesced or encrusted $PCl_5$ is very difficult to remove from the container and also difficult to meter for use in a chemical reaction. As is known, $PCl_5$ absorbs water, undergoes conversion to phosphorus oxychloride and hydrogen chloride, and evolves smoke, in contact with air. It is therefore good and safe practice to handle $PCl_5$ in a closed system with the complete exclusion of air. Despite this, it has not been possible heretofore to avoid the coalescence of $PCl_5$ under these conditions, after storage for some prolonged time.

The factors which in the end cause the coalescence of $PCl_5$ and the reaction mechanism involved have not yet been fully described. It is generally accepted however that minimum quantities of moisture, e.g. atmospheric moisture, contribute to promoting this process. Liquid $POCl_3$ which is being formed together with hydrogen chloride can reasonably be assumed to play an important part in this phenomenon. Even traces of moisture or $POCl_3$ may be liable to initiate the coalescence of $PCl_5$.

In the continuous production of $PCl_5$, described e.g. in "Ullmanns Encyklopädie der technischen Chemie", Springer Verlag, 3rd edition (1962), vol. 13, pages 562 and 563, it is customary for the $PCl_5$ to be exclusively processed in closed devices.

In other words, it is only possible for the product to come into contact with the open air during the very short period needed for placing it in a suitable container or reservoir. Irrespective of this very short contact with the open air, $PCl_5$ is liable to coalesce inside the containers, which are normally provided with an acidproof polyethylene lining and with a sealed clamping ring cover, after storage for some time.

Coalesced $PCl_5$ is hard and brittle and all attempts made to reform it have failed inasmuch as it invariably resolves into crystalline powder. In contrast with this, $PCl_5$ and $POCl_3$ have been found to coalesce to soft and formable material. As can be inferred from tests made on the behaviour of loosely aggregated $PCl_5$ in contact with air, it is not the reaction of $PCl_5$ with atmospheric moisture alone which entails the formation of hard coalesced material. During these tests, loosely aggregated $PCl_5$ became relatively rapidly volatile and could not be found to coalesce intermediarily or assume a liquid phase. In other words, the art is not aware of those additional factors which together with traces of moisture critically determine the coalescence of $PCl_5$ in closed containers.

It is therefore an object of the present invention to provide a process permitting the original flow properties of $PCl_5$, which is stored in a closed reservoir or container, to be preserved over prolonged periods of time, say 6 months or so. To this end, the invention provides for a certain proportion of a specific liquid to be added to flowable $PCl_5$.

The present invention relates more particularly to a process inhibiting the coalescence of flowable phosphorus pentachloride in a closed container, which comprises: admitting a readily volatizable organic liquid boiling within the range about 20° to 200° C. and being inert with respect to $PCl_5$ to the container prior to, during or after the introduction of $PCl_5$ thereinto, and hermetically sealing the container; the liquid being used in a proportion of about 1 to 15 weight%, based on the quantity of $PCl_5$.

It is preferable in accordance with this invention to use an incombustible liquid of low toxicity. It is also possible however to use a combustible liquid naturally with the necessary care.

The liquids which should more preferably be used comprise partially or completely chlorinated $C_1$-$C_7$ hydrocarbons, e.g. methylene chloride, chloroform, carbon tetrachloride, tetrachloroethylene, monofluorotrichloromethane or trifluorotrichloroethane.

The combustible liquids comprise liquefied butane, benzene, cyclohexane and further hydrocarbons boiling within the range 20° to 200° C.

A further preferred feature of the present process provides for the liquid to be used in a proportion of 4 to 8 weight%, based on the quantity of $PCl_5$.

The following statements are intended further to illustrate this invention.

It is basically possible to use any organic liquid which does not react with $PCl_5$ and either has a sufficiently low boiling point or does not adversely affect the processing of $PCl_5$. It is preferable however to use low-boiling substances as these are easier to distribute in the solid matter. Added to freshly produced $PCl_5$ which may still have a temperature of 30° C. inside a reservoir, i.e. prior to placing the $PCl_5$ in a barrel, the low boiling substances of high vapor pressure become rapidly and regularly distributed therein in the absence of any mechanical agitation.

Phosphorus pentachloride is often used for effecting chlorination reactions under mild conditions at low temperatures, which may be affected e.g. in a methylene chloride suspension. In this event, it is naturally good practice to use $PCl_5$ which has been treated with methylene chloride in accordance with this invention, the liquid addend and solvent used for making the suspension being jointly removed distillatively, after the reaction.

It is normally not necessary to mix the $PCl_5$ mechanically with the liquid which is added thereto. This may however be done by placing the filled container in a tumbling mixer, or by another known method. It is also possible to spray the liquid at regular intervals on to the $PCl_5$ while filling it into the container.

The present process compares favorably with the prior art in respect of the following points: It enables the flowability of freshly produced $PCl_5$ to be preserved over prolonged periods of time in tightly closed containers. The good flowability of $PCl_5$ remains substantially unchanged even if the container with the $PCl_5$ therein should be repeatedly opened and closed intermediarily. The $PCl_5$ unexpectedly remains flowable after evaporation or distillation of the liquid, even if it is partially soluble therein. The use of $PCl_5$ in admixture with one of the liquids specified hereinabove entails a further technically beneficial effect which resides in the $PCl_5$'s reduced power for absorbing moisture from the air. In other words, PCl$_5$ which is treated in accordance with this invention remains unchanged and fully effective; even in contact for some short time with atmospheric moisture, it is not liable to undergo decomposition by undesirable hydrolysis.

The following Examples illustrate the invention:

EXAMPLE 1

Three sheet metal durms, of which each was provided with a polyethylene lining and was hermetically closable by means of a clamp ring cover, were filled with PCl$_5$ as described below.

A drum 1 was filled with 50 kg of freshly produced PCl$_5$. Next, the PCl$_5$ was admixed at once with 2 kg methylene chloride and the drum was closed.

A drum 2 was first supplied with 2 kg of methylene chloride, which was poured thereinto, 50 kg of PCl$_5$ was then added, and the drum was closed.

A drum 3 was filled just with 50 kg of PCl$_5$ and closed.

The three sheet metal drums were stored while kept still over a period of 8 months at room temperature and then opened. The PCl$_5$ in drum 1 and drum 2 had good flow properties. Samples taken from the bottom and surface layers of the PCl$_5$ stored in these two drums were analyzed and found to contain a regular methylene chloride content of 3.6 to 4 weight%. The PCl$_5$ stored in drum 3 was covered with an encrusted surface layer 6 cm thick and hard as stone. In addition to this, several agglomerates up to 5 cm wide were found to have been formed in the interior of the PCl$_5$-material.

EXAMPLE 2

(a) 5 kg of PCl$_5$ was produced discontinuously in a laboratory device and collected in a glass bottle with the exclusion of air. Next, 0.4 kg of trifluorotrichloroethane was added at once at 30° C. and the whole was poured from the glass bottle into a 10 l-can which was closed by means of a clamp ring cover.

(b) The procedure was as under (a) above, save that trifluorotrichloroethane was added in altogether eight 50 g portions at regular intervals while filling the PCl$_5$ into the glass bottle. The resulting mixture was stored in a 10 l-can as described under (a) above.

(c) The procedure was as under (a) above, save that the filled can, which was closed by means of a clamping ring cover, was mechanically moved over 30 minutes in a tumbling mixer.

(d) The procedure was as under (a) above, save that no trifluorotrichloroethane was added to PCl$_5$.

After storage for 6 months, the four specimens were tested. Specimens (a) through (c) were all flowable. In contrast with this, specimen (d) contained heavily coalesced material in its interior and was covered by an encrusted surface layer about 2 cm thick.

EXAMPLE 3

The procedure was as described in Example 2, save that the trifluorotrichloroethane added was replaced in each particular case by 200 g of one of the following organic liquids: chloroform, carbon tetrachloride, tetrachloroethylene, monofluorotrichloromethane, butane, benzene, and cyclohexane.

After storage for 6 months in cans which were closed by means of clamp ring covers, the respective materials were found to be reliably flowable.

EXAMPLE 4

7 cans were used of which each was filled in the manner described in Example 2(a) with 5 kg of PCl$_5$. Methylene chloride was added in varying proportions and the various cans were stored over a period of 6 months. The cans were then opened and their contents inspected. The following results were obtained.

TABLE:

| Can No. | Methylene chloride added in g | PCl$_5$-condition |
|---|---|---|
| 1 | 50 g | slightly encrusted surface about 5 mm thick |
| 2 | 150 g | readily flowable product |
| 3 | 250 g | free from encrustation and |
| 4 | 450 g | coalesced material |
| 5 | 550 g | |
| 6 | 650 g | Free from encrustation and |
| 7 | 750 g | coalesced material but moist with methylene chloride and of limited flowability |

EXAMPLE 5

The material contained in cans 3 and 4 of Example 4 was poured in each case into a 5 l-glass flask which was placed in a water bath maintained at 60° C. Secured to the opening of each flask was a drying tube which was filled with calcium chloride. After 2 hours, the glass flask was evacuated for a short while (about 5 minutes), so as to completely expel methylene chloride.

The PCl$_5$ retained in the two flasks had extremely good flow properties.

EXAMPLE 6

5 kg of PCl$_5$ was produced twice as described in Example 2(a) and placed in two 10 l-cans (a) and (b) provided with clamp ring covers. 500 g of carbon tetrachloride was added to the PCl$_5$ in can (a), but no carbon tetrachloride was added to the PCl$_5$ in can (b). The two cans were stored for 6 months, their respective covers being opened at four week intervals, each time for 5 minutes. Care was taken to keep the product substantially still during this operation. In contact with atmospheric moisture, the material in can (b) was always found to evolve considerably more hydrochloric acid smoke than the material in can (a). After the above storage period, the product in can (a) with a slightly encrusted surface layer about 2 mm thick was flowable as opposed to the product in can (b) which contained heavily coalesced material and of which the surface was encrusted with a layer about 9 cm thick. The two products were mechanically comminuted and homogenized. Next, a 500 g portion of each of specimens (a) and (b) was placed in a glass flask which was in a water bath and heated therein for 15 minutes to 50° C. under vacuum.

The PCl$_5$-content of specimens (a) and (b) was determined by elementary analysis. Specimen (a) contained more than 99.5% and specimen (b) about 98.5% of PCl$_5$.

We claim:

1. A process of inhibiting the coalescence of flowable phosphorus pentachloride during extended storage in a closed container, which comprises: admitting a readily volatizable organic liquid boiling within the range of from about 20° to 200° C. and being inert with respect to phosphorus pentachloride to the container prior to, during or after the introduction of phosphorus pentachloride thereinto, and hermetically sealing the container, the liquid being used in a proportion of about 1 to 15 weight %, based on the quantity of phosphorus pentachloride.

2. The process as claimed in claim 1, wherein an incombustible liquid of low toxicity is used.

3. The process as claimed in claim 1, wherein the liquid used is a partially or completely chlorinated hydrocarbon.

4. The process as claimed in claim 1, wherein the liquid used is a member selected from the group consisting of methylene chloride, chloroform, carbon tetrachloride, tetrachloroethylene, monofluorotrichloromethane and trifluorotrichloroethane.

5. The process as claimed in claim 1, wherein the liquid used is a member selected from the group consisting of liquefied butane, benzene and cyclohexane.

6. The process as claimed in claim 1, wherein the liquid is used in a proportion of 4 to 8 weight %, based on the quantity of phosphorus pentachloride.

* * * * *